Figure 1:
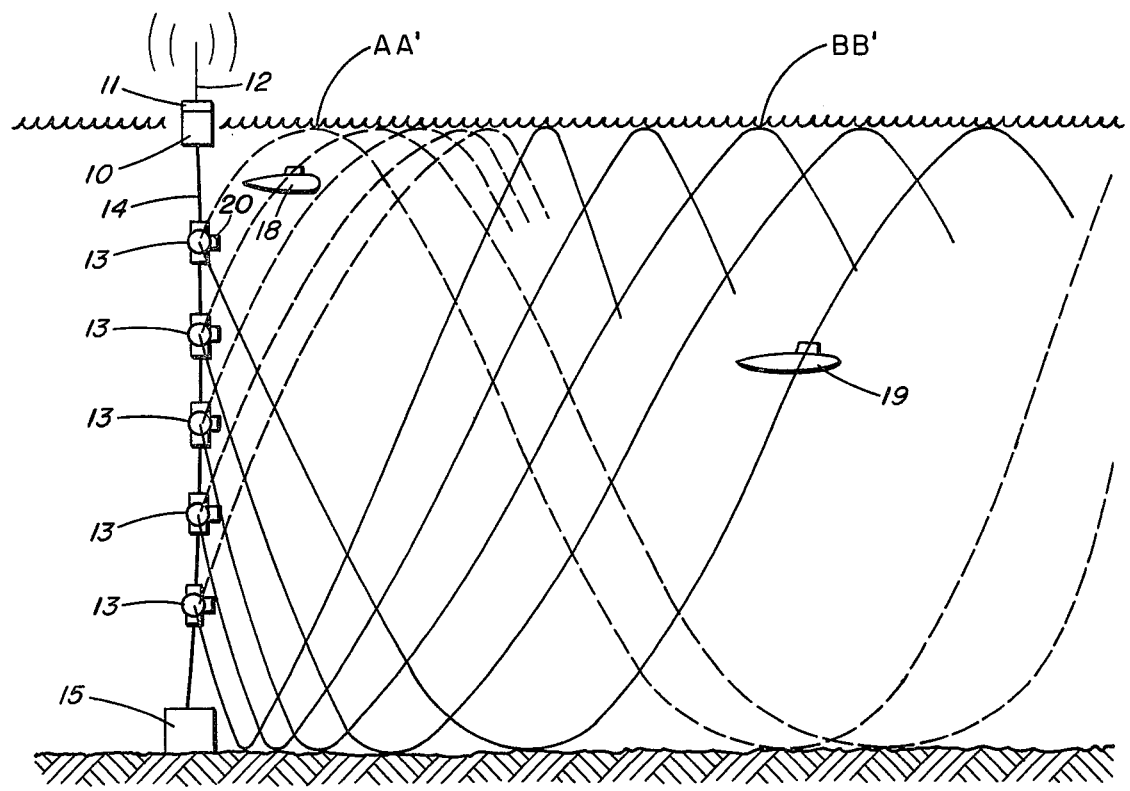

United States Patent [19]
Urick

[11] 3,982,222
[45] Sept. 21, 1976

[54] DEEP HYDROPHONE STRING

[75] Inventor: Robert J. Urick, Silver Spring, Md.

[73] Assignee: The United States of America as represented by the Secretary of the Navy, Washington, D.C.

[22] Filed: Oct. 22, 1965

[21] Appl. No.: 502,713

[52] U.S. Cl. .................................. 340/2; 340/6 R
[51] Int. Cl.² .......................................... G01S 9/66
[58] Field of Search ............................. 340/2, 6, 9

[56] References Cited
UNITED STATES PATENTS 2,838,741  6/1958  Mason ................................. 340/2

*Primary Examiner*—Richard A. Farley

[57] ABSTRACT

A string of hydrophone units, each unit being positioned at a different preselected depth and having sensors arranged so as to receive sound waves emanating from vessels positioned within an annular zone defined by a conical pencil of rays upwardly-divergent or downwardly-divergent from each unit.

5 Claims, 2 Drawing Figures

U.S. Patent  Sept. 21, 1976  3,982,222

INVENTOR.
Robert J. Urick
BY
ATTORNEY.
AGENT.

DEEP HYDROPHONE STRING

The invention described herein may be manufactured and used by or for the Government of the U.S.A. for governmental purposes without the payment of any royalties thereon or therefor.

This invention relates to long range detection, surveillance and communication by means of sonobuoys operating in the deep sea and is more particularly concerned with a deep hydrophone string operatively connected with a specialized sonobuoy for this purpose.

Sound responsive detection buoys, or sonobuoys, have been used in the past in attacking enemy submarines known to be within a reasonable restricted area, and have proved valuable in such use. In general, these buoys are dropped from airplanes and comprise a battery-powered radio transmitter which is modulated by a hydrophone to enable an operator in an attacking airplane to hear the ocean noises at the location of the buoy and to thus locate the submarine.

Most sonobuoys presently used for this purpose operate only between depths of sixty and fifteen hundred feet. At these depths they are limited in their performance by the acoustic paths existing in deep water, which restrict the range operation to comparatively short distances. At the extreme depths of 12,000 feet and below various buoys that are now in preliminary stages of development utilize direct paths which are similarly limited by acoustic paths in the deep sea. Because of these path limitations, existing sonobuoys provide only a restricted range coverage that greatly restricts their usefulness in long range detection, communication and surveillance applications.

The propagation of sound in sea water is known to occur along rays which are subject to refraction by variations in sound velocity. In most areas of the oceans, the velocity of sound varies directly with the pressure and temperatures of the water, the pressure of course increasing with the depth. The temperature varies over a wide range near the surface and decreases very rapidly to a temperature of near freezing several thousand feet below the surface. Therefore, near the surface of the ocean, the temperature of the water affects the propagation rate more than the pressure, so that the propagation rate becomes slower as the depth increases to this point. Under these conditions, the lower edge of the sound wave moves slower than the upper edge so that the sound wave is progressively refracted toward the bottom of the ocean and does not move outward in a straight line.

At a depth of several thousand feet, the temperature becomes quite low and thereafter decreases very slowly, so that the increasing pressure as greater depth is obtained then becomes predominent and accordingly serves to increase the propagation rate. The sound waves initiated near the surface are thus re-refracted toward the surface.

As a result of the rays being refracted to form continuous reversely-bent paths which extend in a generally horizontal direction, there occurs little loss of energy. This feature persists to a useful extent even though there occurs considerable deviation. Sound signals occurring along such reversely-bent rays may in this way, therefore, be transmitted over distances of several thousand miles.

In a copending application, Ser. No. 452,460, filed Apr. 28, 1965 by Robert J. Urick and Robert L. Parris, for "Free-Falling Sonobuoy", there is disclosed a method for detecting the presence of enemy submarines which involves a novel search-in-depth concept of acoustic ranging, a specialized sonobuoy provided for practicing the method is adapted to sink a hydrophone unit to substantial depths, carrying with it a linear array of hydrophone elements arranged so as to receive acoustic signals in two directions, one diverging upward and one downward in all azimuthal directions so as to form annuli at the intersection of the water surface. Received signals are then sent over a cable to a float and transceiver on the surface within the sonobuoy.

This unique method of operating the device as it falls under the force of its own weight provides an acoustic scan of the entire volume of the sea out to substantial ranges. At shallow depths the annulus from the upwardly-directed beam is close in and that from the downwardly-directed beam is far out, but as the unit sinks, the upward beam scans outwardly and the downward beam scans inwardly. In accordance with the present invention, a string of hydrophone units located at approximately two thousand-foot intervals, each being amplified and used to modulate its own carrier frequency for transmission up a single-conductor cable to the surface, is substituted for the single, free-falling hydrophone unit aforedescribed.

Certain inherent disadvantages of the free-falling hydrophone are avoided by the present invention of multiple fixed hydrophones. For example, the present invention is able to provide continuous surveillance at all depths instead of intermittent coverage at various depths and the noise factor is substantially lower with the present invention because the hydrophones thereof remain stationary.

Accordingly, one of the objects of the present invention is to provide improved means for long range detection, surveillance, and communication by means of sonobuoys operating in deep seas.

Another of the objects is to provide acoustic ranging apparatus in which acoustic signals are received in two directions, upwardly and downwardly divergent in all azimuthal directions, from multiple points spaced at given intervals along a line from a point on the surface of the water to a point at the ocean bottom.

Still another object is to provide a deep hydrophone string comprising a plurality of hydrophone elements positioned in spaced intervals from a point on the surface of the water to a point on the ocean bottom and which are so arranged that each may receive acoustic signals in two directions, one divergent upwardly and the one divergent downwardly in all azimuthal directions, to provide continuous surveillance of the entire volume of the sea out to substantial ranges with relatively little noise.

Figure 2:
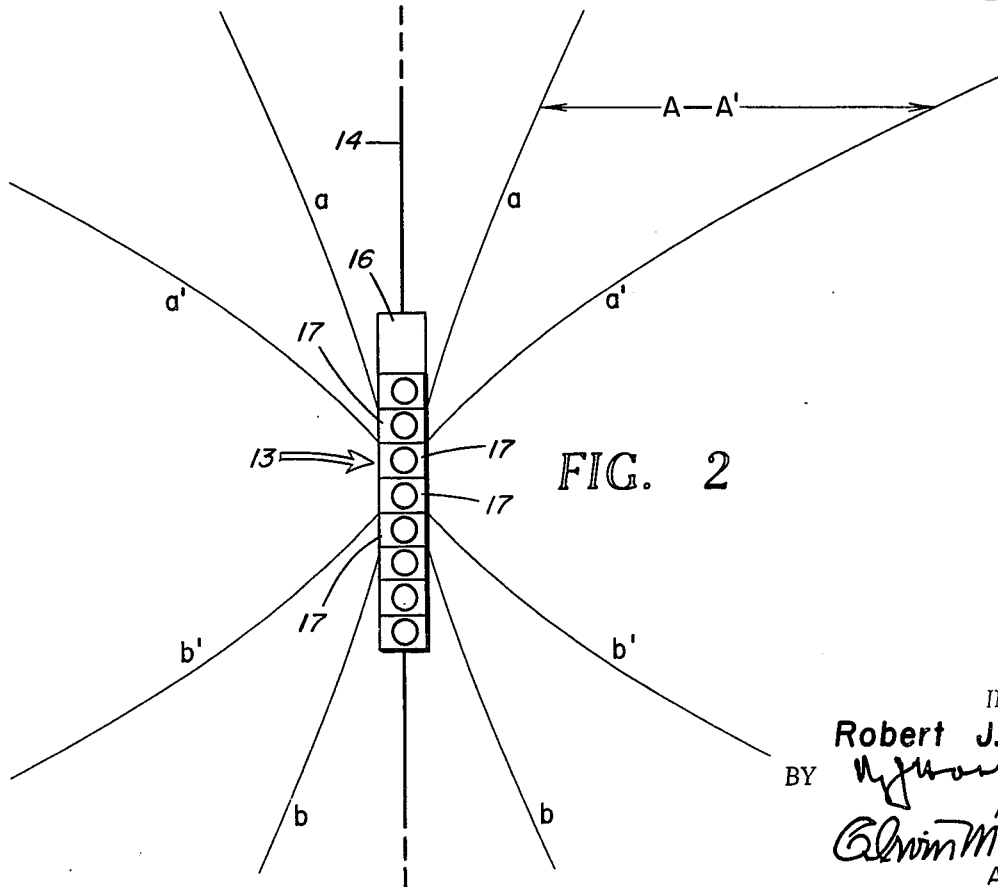

Still other objects, advantages and improvement will be apparent from the following description when taken in connection with the accompanying drawings wherein:

FIG. 1 is a graphic representation of a deep hydrophone string and the unique ray transmission characteristics of sound in the deep sea; and FIG. 2 is an enlarged elevational view of a single hydrophone element from the string formed according to the present invention.

Referring now to the drawings for a more complete understanding of the invention and more particularly to FIG. 1 thereof, there is shown thereon a buoyant number 10 containing a radio transceiver 11 having an antenna 12 thereon and conventional in every essential way with existing sonobuoys. A plurality of hydrophones 13 are mechanically linked together at predetermined spaced intervals and supported from the buoyant member 10 by a flexible cable 14, which includes the electrical connection between the hydrophones 13 and has its lower end secured to an anchor member 15. For the purpose of this description the hydrophones 13 shown in FIG. 1 may be considered as being spaced at intervals of approximately 2,000 feet, that is, at depths of 2,000, 4,000, 6,000, 8,000 and 10,000 feet, but in practice the specific number and depths of the hydrophone units are determined by the velocity depth profile at the place where they are to be used. The output of each hydrophone is amplified and used to modulate its own carrier frequency for transmission up the single-conductor cable 14 to the surface and standard demodulation techniques are used to recover and display the outputs of the hydrophones.

Referring now to FIG. 2, and individual hydrophone 13 from the string of hydrophones shown in FIG. 1 is shown supported from the flexible cable 14 and provided with an electronics unit 16 and a linear array of hydrophone elements 17 packaged therein. The electronics unit 16 comprises a preamplifier and beamforming networks for the hydrophone array 17, and in addition may include a flux gate or other kind of compass for providing the north-south orientation of the unit. When the horizontal direction of a target signal is required, a number of such vertical arrays will be utilized together with additional beam-forming networks to provide directional information. The hydrophone unit 13 of this invention forms two beams, one directed angularly-upward and one directed angularly-downward, by conventional methods, enabling the buoy to acoustically "see" in the directions of the rays $aa'$ and $bb'$. Signals arriving in these two directions are amplified and transmitted separately to the monitoring aircraft by conventional modulation, multiplexing, or time-sharing techniques. The purpose of the beam formation is twofold: first, to discriminate against noise arriving at the hydrophone array in undesired directions and to enhance signals arriving within the desired directions, and second, to provide information as to the range from which the particular signal is coming.

The search-in-depth concept of acoustic ranging permitted by the present invention is basically a way of taking advantage of certain unique transmission characteristics of sound in the deep sea. These characteristics are best described in ray diagrams showing the distribution of sound in the sea, and illustrated in the drawings. At the particular depth at which any hydrophone unit 13 is positioned an annulus $AA'$ is insonified via a conical pencil of rays $aa'$ leaving the hydrophone unit 13 in an upward direction and an annulus $BB'$ is insonified via a cone of rays $bb'$ leaving the hydrophone unit at downward angles. For descriptive purposes and simplified illustration, the respective rays and annuli are shown in FIG. 1 merely as being angularly-upward and -downward directed lines, the paths of the upward-directed rays being shown as dashed lines and the paths of the downward-directed rays being shown as solid lines. Sound radiated by a target in annulus $AA'$ of rays $aa'$, such as for example, submarine 18, reaches the hydrophone unit 13 via the rays $aa'$ and the sound of a target in the more distance zone $BB'$, such as submarine 19, reaches the unit within the cone provided by rays $bb'$. These are highly favorable acoustic paths inasmuch as they form convergent zones, or caustics, near the surface. With the hydrophone units 13 positioned at the more shallow depths, zone $AA'$ lies at a range of only a few miles and zone $BB'$ lies, in much of the deep waters of the ocean, at a range of 30 to 35 miles. Similarly, with the hydrophone units positioned at greater depths, the zone $AA'$ is positioned at a greater range than it is with the more shallow hydrophone units and the zone $BB'$ is positioned at a lesser range than it is with the more shallow units, so that at a depth of 12,000 feet or less, the two zones come together. Thus, with the hydrophone string of the present invention, complete range coverage is had over internal acoustic paths in the sea involving no reflections from the sea surface or bottom, and over which a convergent gain in transmission of between 6 and 20 decibels is had over what would be obtained with straight-line propagation.

Although the present invention has been described operatively as a passive unit, it should be apparent that both passive and active versions are available, depending upon whether the sound radiated by a desired target, or an echo reflected from it, is utilized. An active sonobuoy utilizes echoes generated by a transmitting unit 2 that is part of the buoy system and which generates acoustic energy through conventional techniques. Alternatively, explosive charges may be used for this purpose, either attached to and forming a part of the buoy until released by radio command, or else as entirely separated charges dropped by a monitoring aircraft. Accordingly, it may be seen that by taking advantage of certain unique transmission characteristics of sound in the deep sea, the present invention of a deep hydrophone string provides improved means for long range detection, surveillance, and communication, affording continuous surveillance at all ocean depths.

While a preferred embodiment of the invention has been shown, it should be understood that various changes and modifications may be resorted to, in keeping with the spirit of the invention as defined by the appended claims.

What is claimed is:

1. A deep hydrophone string for detecting the presence of underwater vessels comprising:
    a floating buoy,
    an anchor member,
    a cable means connecting said buoy and said anchor member,
    a plurality of hydrophone units supported by said cable means and spaced at predetermined intervals thereon between said buoy and said anchor member,
    an array of hydrophones within each of said units and so arranged therein to receive sound waves emanating from vessels positioned within the annular zone defined by a conical pencil of rays upwardly-divergent from the array,
    an array of hydrophones within each of said units and so arranged therein to receive sound waves emanating from vessels positioned within the annular zone defined by a conical pencil of rays downwardly-divergent from the unit,
    means within each of said units for amplifying and transmitting signals of any sound waves so received through said cable to the buoy, and
    means within said buoy for transmitting said signals to a surface monitor.

2. The deep hydrophone string of claim 1 wherein said cable connecting said buoy and said anchor is sufficiently long to permit said buoy to float on the surface and said anchor to rest on the ocean floor.

3. The deep hydrophone string of claim 2 wherein said hydrophone units are spaced along said cable at intervals of approximately 2000 feet.

4. A deep hydrophone string according to claim 3 wherein the centers of the annular zones defined by said conical pencils of rays of each of said hydrophone units lie upon a line substantially perpendicular to the surface of the water and passing through said anchor member.

5. A deep hydrophone string according to claim 4 wherein each of said hydrophone units further includes means for transmitting sound waves to the underwater vessels to be detected, whereby said sound waves thereafter may be reflected from said vessels and received by said hydrophone units.

* * * * *